US 9,851,101 B2

(12) United States Patent
Masuda et al.

(10) Patent No.: US 9,851,101 B2
(45) Date of Patent: Dec. 26, 2017

(54) BOILER SYSTEM AND POWER PLANT INCLUDING THE SAME

(71) Applicant: MITSUBISHI HITACHI POWER SYSTEMS, LTD., Kanagawa (JP)

(72) Inventors: Tomotsugu Masuda, Kanagawa (JP); Masashi Kiyosawa, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/026,452

(22) PCT Filed: Jun. 5, 2015

(86) PCT No.: PCT/JP2015/066296
§ 371 (c)(1),
(2) Date: Mar. 31, 2016

(87) PCT Pub. No.: WO2015/186818
PCT Pub. Date: Dec. 10, 2015

(65) Prior Publication Data
US 2016/0245511 A1   Aug. 25, 2016

(30) Foreign Application Priority Data
Jun. 6, 2014   (JP) .................. 2014-117685

(51) Int. Cl.
*B01D 53/14* (2006.01)
*B01D 53/56* (2006.01)
(Continued)

(52) U.S. Cl.
CPC .............. *F23J 15/02* (2013.01); *F01K 13/00* (2013.01); *F22B 31/08* (2013.01); *F23J 15/00* (2013.01); *F23L 15/00* (2013.01); *F23L 15/04* (2013.01)

(58) Field of Classification Search
CPC ............ B01D 53/1481; B01D 53/1508; B01D 53/56; B01D 53/75; B01D 53/81;
(Continued)

(56) References Cited

U.S. PATENT DOCUMENTS

| 2011/0274606 A1 | 11/2011 | Melville et al. |
| 2013/0156665 A1 | 6/2013 | Jankura et al. |
| 2016/0053996 A1* | 2/2016 | Stallmann ............. B01D 53/50 122/421 |

FOREIGN PATENT DOCUMENTS

| CN | 101746737 | 6/2010 |
| EP | 0 278 025 | 8/1988 |

(Continued)

OTHER PUBLICATIONS

Notice of Intention to Grant dated Nov. 24, 2015 in corresponding Japanese Application No. 2014-117685 (with English translation).*

(Continued)

*Primary Examiner* — Timothy Vanoy
(74) *Attorney, Agent, or Firm* — Wenderoth, Lind & Ponack, L.L.P.

(57) ABSTRACT

A boiler system is provided including: a boiler that burns fuel containing sulfur content, chlorine content, and water content to generate a combustion gas; a bagfilter that removes sulfur oxide; a denitration section that removes nitrogen oxide; a desulfurizing absorbent supply section that mixes a desulfurizing absorbent into the combustion gas on an upstream side of the bagfilter; and a reformer that mixes a denitrating reagent into the combustion gas on an upstream side of the denitration section, wherein the bagfilter performs dry desulfurization, and a temperature of the combustion gas passing through the bagfilter and flowing into the denitration section is higher than 200° C. and 350° C. or lower, and the combustion gas from which the sulfur oxide (Continued)

has been removed by the bagfilter flows into the denitration section without being heated on the upstream side of the denitration section.

17 Claims, 5 Drawing Sheets

(51) Int. Cl.
    *B01D 53/75*     (2006.01)
    *B01D 53/81*     (2006.01)
    *B01D 46/00*     (2006.01)
    *F23J 15/02*     (2006.01)
    *F23J 15/00*     (2006.01)
    *F23L 15/00*     (2006.01)
    *F22B 31/08*     (2006.01)
    *F23L 15/04*     (2006.01)
    *F01K 13/00*     (2006.01)

(58) Field of Classification Search
    CPC ........ B01D 2257/302; B01D 2257/404; B01D 2258/0283; B01D 46/00
    See application file for complete search history.

(56) References Cited

FOREIGN PATENT DOCUMENTS

| | | |
|---|---|---|
| JP | 50-102566 | 8/1975 |
| JP | 58-36621 | 3/1983 |
| JP | 58-84026 | 5/1983 |
| JP | 3-12222 | 1/1991 |
| JP | 3-45812 | 2/1991 |
| JP | 4-354538 | 12/1992 |
| JP | 8-192029 | 7/1996 |
| JP | 8-206446 | 8/1996 |
| JP | 8-332343 | 12/1996 |
| JP | 9-234333 | 9/1997 |
| JP | 10-57757 | 3/1998 |
| JP | 2001-137663 | 5/2001 |
| JP | 2002-113331 | 4/2002 |
| JP | 2004-33989 | 2/2004 |
| JP | 2006-205128 | 8/2006 |
| JP | 2010-48456 | 3/2010 |
| JP | 2010-507480 | 3/2010 |
| JP | 2011-120981 | 6/2011 |
| JP | 2012-522930 | 9/2012 |
| JP | 5030343 | 9/2012 |
| JP | 2012-223668 | 11/2012 |
| JP | 2014-13102 | 1/2014 |
| WO | 2010/114876 | 10/2010 |
| WO | 2013/049058 | 4/2013 |

OTHER PUBLICATIONS

First Office Action issued Sep. 8, 2016 in corresponding Chinese Application No. 201580002105.3 (with English translation).

International Search Report issued Sep. 8, 2015 in corresponding International Application No. PCT/JP2015/066296.

Notification of Reasons for Rejection dated May 12, 2015 in corresponding Japanese Application No. 2014-117685 (with English translation).

Notification of Reasons for Rejection dated Sep. 1, 2015 in corresponding Japanese Application No. 2014-117685 (with English translation).

Written Opinion of the International Searching Authority dated Sep. 8, 2015 in corresponding International Application No. PCT/JP2015/066296.

* cited by examiner

FIG. 2

| FUEL | SMOKE DUST [wt%] | SULFUR [wt%] | CHLORINE [wt%] | WATER [wt%] |
|---|---|---|---|---|
| COAL A | 13.6 | 0.4 | MINIMAL | 8.3 |
| COAL B | 13.1 | 0.6 | MINIMAL | 9.0 |
| COAL C | 12.6 | 0.9 | MINIMAL | 9.1 |
| COAL D | 11.0 | 0.3 | MINIMAL | 10.3 |
| COAL E | 6.3 | 0.5 | MINIMAL | 7.5 |
| BIOMASS | 3.4 | 0.1 | MINIMAL | 9.6 |
| HEAVY OIL | 0.9~5.8 | 4.5~7.6 | MINIMAL | MINIMAL |
| MUNICIPAL SOLID WASTE | 6.0~7.0 | 0.0~0.2 | 0.1~0.2 | 43.0~58.0 |

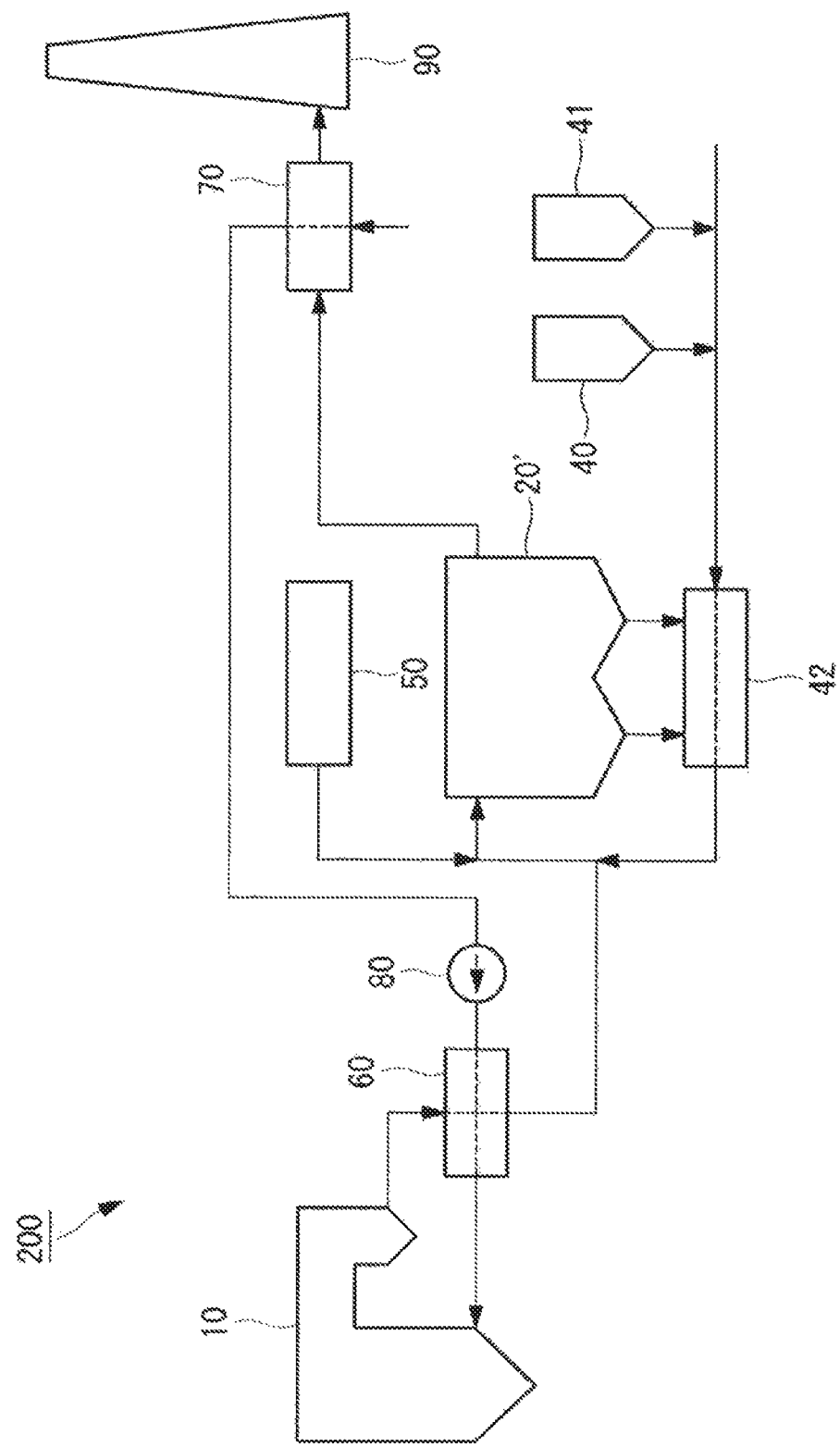

BOILER SYSTEM AND POWER PLANT INCLUDING THE SAME

TECHNICAL FIELD

The present invention relates to a boiler system and a power plant including the same.

BACKGROUND ART

A conventionally known boiler system including a boiler that burns fuel such as coal, heavy oil, or biomass includes a denitration device that removes nitrogen oxide (NOx) contained in a combustion gas exhausted from the boiler, and a desulfurization device that removes sulfur oxide (SOx) contained in the combustion gas.

In many of such boiler systems, a denitration device, an electrostatic precipitator, and a desulfurization device are arranged in this order from a side of the boiler. Also, as a denitration device, which is often used that sprays ammonia ($NH_3$) into a combustion gas generated by burning to reduce nitrogen oxide in the combustion gas.

However, if the denitration device that uses ammonia as a reagent is arranged on an upstream side of the desulfurization device, a large amount of sulfur oxide is mixed in the combustion gas flowing into the denitration device. In this case, in the denitration device, the sulfur oxide and the ammonia in the combustion gas react to generate acid ammonium sulfate (ammonium hydrogen sulfate: ($NH_4$) $HSO_4$). Accumulation of ash in a flow path or a device on a downstream side of the denitration device caused by the acid ammonium sulfate prevents passage of the combustion gas and increases pressure loss. Also, the sulfur oxide contained in the combustion gas reacts with metal to corrode the metal. Further, the acid ammonium sulfate produces condensable particulates (for example, particulate matter referred to as PM2.5).

Also, if the electrostatic precipitator is arranged on the downstream side of the denitration device, impurities such as smoke dust are mixed in the combustion gas flowing into the denitration device. The impurities adhere to a catalyst provided in the denitration device and thus deteriorate the catalyst, thereby reducing the life of the denitration device.

PTL 1 proposes a boiler system in which an electrostatic precipitator, a desulfurization device, and a denitration device are arranged in this order from a side of a boiler. The boiler system described in PTL 1 can solve the problems described above because impurities such as sulfur oxide or smoke dust are removed from a combustion gas introduced into the denitration device.

PTL 2 discloses a lean combustion engine that partially oxidizes and converts diesel fuel into carbon monoxide and hydrogen, and supplies the carbon monoxide and the hydrogen to a hydrocarbon selective catalystic reduction catalyst as reagents.

PTL 3 discloses a NOx reduction method for reducing nitrogen oxide by catalyst action using a hydrocarbon reagent.

PTL 4 discloses an exhaust gas treatment catalyst that supports Ir and other metals in an alloy state on a carrier.

PTL 5 discloses a device in which a desulfurization device, smoke dust collection means, and a denitration catalyst are arranged in this order from a side of the engine.

CITATION LIST

Patent Literature

{PTL 1}
Japanese Unexamined Patent Application, Publication Hei No. 08-206446

{PTL 2}
Japanese Translation of PCT International Application, Publication No. 2012-522930

{PTL 3}
Japanese Translation of PCT International Application, Publication No. 2010-507480

{PTL 4}
Japanese Unexamined Patent Application, Publication No. 2004-33989

{PTL 5}
the Publication of Japanese Patent No. 5030343

SUMMARY OF INVENTION

Technical Problem

Since the boiler system described in PTL 1 uses a wet desulfurization device, the combustion gas passes through the desulfurization device and is thus reduced in temperature. For this reason, in PTL 1, the combustion gas having passed through the desulfurization device is heated by a heating device to a temperature at which a denitration reaction is obtained, and then supplied to the denitration device.

However, in the boiler system described in PTL 1, the combustion gas to be supplied to the denitration device needs to be heated by the heating device, which reduces thermal efficiency of the entire boiler system.

PTL 2 relates to a system that removes nitrogen oxide in an exhaust gas flow from the lean combustion engine, and does not relate to removal of an exhaust gas containing sulfur oxide.

PTL 3 relates to a catalyst that removes nitrogen oxide in an exhaust gas from a diesel engine, and does not relate to a system including removal of sulfur oxide.

PTL 4 relates to the exhaust gas treatment catalyst that purifies an exhaust gas containing nitrogen oxide, and does not relate to a system including removal of sulfur oxide.

PTL 5 discloses removal of nitrogen oxide, sulfur oxide, and smoke dust, but does not relate to a technology of simultaneously performing desulfurization and dust removal, or desulfurization and denitration.

The present invention is achieved in view of such circumstances, and has an object to provide a boiler system capable of removing sulfur oxide and nitrogen oxide in a combustion gas without reducing thermal efficiency of the entire boiler system, and a power plant including the same.

Solution to Problem

To achieve the above described object, the present invention adopts the following solutions.

A first aspect of the present invention provides a boiler system including: a boiler that burns fuel containing sulfur content at a weight percent concentration of lower than 8.0%, chlorine content at a weight percent concentration of lower than 0.1%, and water content at a weight percent concentration of lower than 20.0% to generate a combustion gas; a removal section that removes sulfur oxide contained in the combustion gas and removes smoke dust contained in the combustion gas; a denitration section that removes nitrogen oxide contained in the combustion gas from which the sulfur oxide has been removed by the removal section; a desulfurizing absorbent supply section that mixes an absorbent for removing sulfur oxide contained in the combustion gas into the combustion gas on an upstream side of the removal section; and a denitrating reagent supply section that mixes a reagent for removing nitrogen oxide contained in the combustion gas into the combustion gas on an upstream side of the denitration section, wherein the removal section performs dry desulfurization, and a temperature of the combustion gas flowing into the removal section is higher than 200° C. and 350° C. or lower, and the combustion gas from which the sulfur oxide has been removed by the removal section flows into the denitration section without being heated on the upstream side of the denitration section.

According to the boiler system of the first aspect of the present invention, the removal section that performs dry desulfurization removes sulfur oxide from the combustion gas exhausted from the boiler on the upstream side of the denitration section. The desulfurization section is of a dry type, and causes little reduction in temperature of the combustion gas as compared to a wet type, and the temperature of the combustion gas is maintained without being reduced between before and after passage through the desulfurization section. Thus, there is no need to provide a heating device for heating the combustion gas to a temperature at which a denitration reaction is obtained on the upstream side of the denitration section. Thus, the denitration section can remove nitrogen oxide without reducing thermal efficiency of the entire boiler system.

Also, according to the boiler system of the first aspect of the present invention, the temperature of the combustion gas flowing into the removal section that removes sulfur oxide and the denitration section that removes nitrogen oxide is maintained at higher than 200° C. and 350° C. or lower. Maintaining the temperature of the combustion gas within such a range allows desulfurization efficiency and denitration efficiency to be maintained at respective certain values or higher.

Also, according to the boiler system of the first aspect of the present invention, the removal section has both a desulfurization function of removing sulfur oxide and a smoke dust removal function of removing smoke dust contained in the combustion gas. This can reduce a size of equipment as compared to a case where a desulfurization section having a desulfurization function and a dust collection section having a smoke dust removal function are separately provided.

Further, smoke dust is not mixed in the combustion gas flowing into the denitration section, thereby increasing the life of the denitration section.

As such, the first aspect of the present invention can provide a boiler system capable of removing sulfur oxide and nitrogen oxide in a combustion gas without reducing thermal efficiency of the entire boiler system.

The boiler system of the first aspect of the present invention may include an air preheater that exchanges heat between the combustion gas exhausted from the boiler and air, supplies the heated air to the boiler as secondary air, and supplies the combustion gas having been reduced in temperature by heat exchange with the air to the removal section.

In this manner, the air preheater can reduce the temperature of the combustion gas flowing into the desulfurization section to higher than 200° C. and 350° C. or lower, at which desired desulfurization efficiency is obtained.

In the boiler system of the first aspect of the present invention, the boiler may adjust the temperature of the combustion gas so that the temperature of the combustion gas exhausted outside is 360° C. or higher and 400° C. or lower, and the air preheater may adjust the temperature of the air so as to reduce the temperature of the combustion gas flowing from the boiler to higher than 200° C. and 350° C. or lower.

In this manner, the temperature of the combustion gas exhausted from the boiler can be adjusted to 360° C. or higher and 400° C. or lower, and then the combustion gas can be reduced to higher than 200° C. and 350° C. or lower by the air preheater.

In the boiler system of the first aspect of the present invention, the denitrating reagent may be a gas mainly containing at least one of carbon monoxide, hydrogen, and hydrocarbon.

In this manner, a problem that accumulation of ash caused by acid ammonium sulfate increases pressure loss is prevented as compared to a case where ammonia is used as a denitrating reagent. Also, a problem that acid ammonium sulfate produces condensable particulates (for example, particulate matter referred to as PM2.5) is prevented.

The boiler system of the first aspect of the present invention may include a humidification section that humidifies air containing the desulfurizing absorbent supplied by the desulfurizing absorbent supply section and supplies the air to the upstream side of the removal section.

In this manner, a reaction between the sulfur oxide contained in the combustion gas and the desulfurizing absorbent can be promoted to increase desulfurization efficiency.

In the boiler system of the first aspect of the present invention, the temperature of the combustion gas flowing into the removal section may be 210° C. or higher and 270° C. or lower. As described above, the removal section performs dry desulfurization, and thus the combustion gas at 210° C. or higher and 270° C. or lower having flowed into the removal section flows into the denitration section while maintaining its temperature.

In this manner, the combustion gas at the temperature at which denitration efficiency in the denitration section is particularly high can be supplied to the denitration section, thereby increasing denitration efficiency in the denitration section.

A second aspect of the present invention provides a boiler system including: a boiler that burns fuel containing sulfur content at a weight percent concentration of lower than 8.0%, chlorine content at a weight percent concentration of lower than 0.1%, and water content at a weight percent concentration of lower than 20.0% to generate a combustion gas; a removal section that removes sulfur oxide and nitrogen oxide contained in the combustion gas; a desulfurizing absorbent supply section that mixes a desulfurizing absorbent for removing sulfur oxide contained in the combustion gas into the combustion gas on an upstream side of the removal section; and a denitrating reagent supply section that mixes a denitrating reagent for removing nitrogen oxide contained in the combustion gas into the combustion gas on the upstream side of the removal section, wherein the removal section has a dry desulfurization function, and a temperature of the combustion gas passing through the removal section is higher than 200° C. and 350° C. or lower.

According to the boiler system of the second aspect of the present invention, the removal section has a dry desulfurization function, and thus causes little reduction in temperature of the combustion gas as compared to a wet one. Also, since the removal section removes sulfur oxide and nitrogen oxide, a denitration reaction is obtained at the temperature of the combustion gas supplied to the removal section. Thus, there is no need to provide a heating device for heating the combustion gas to a temperature at which a denitration reaction is obtained on the upstream side of the removal section. Thus, the removal section can remove nitrogen oxide without reducing thermal efficiency.

Also, according to the boiler system of the second aspect of the present invention, the temperature of the combustion gas flowing into the removal section that removes sulfur oxide and nitrogen oxide is maintained at higher than 200° C. and 350° C. or lower. Maintaining the temperature of the combustion gas within such a range allows desulfurization efficiency and denitration efficiency to be maintained at respective certain values or higher.

Also, according to the boiler system of the second aspect of the present invention, the removal section has both the desulfurization function of removing sulfur oxide and the denitration function of removing nitrogen oxide. This can reduce a size of equipment as compared to a case where a desulfurization section having a desulfurization function and a denitration section having a denitration function are separately provided.

As such, the second aspect of the present invention can provide a boiler system capable of removing sulfur oxide and nitrogen oxide in the combustion gas without reducing thermal efficiency of the entire boiler system.

The boiler system of the second aspect of the present invention may include an air preheater that exchanges heat between the combustion gas exhausted from the boiler and air, supplies the heated air to the boiler as secondary air, and supplies the combustion gas having been reduced in temperature by heat exchange with the air to the removal section.

In this manner, the air preheater can reduce the temperature of the combustion gas flowing into the removal section to higher than 200° C. and 350° C. or lower, at which desired desulfurization efficiency is obtained.

In the boiler system of the second aspect of the present invention, the boiler may adjust the temperature of the combustion gas so that the temperature of the combustion gas exhausted outside is 360° C. or higher and 400° C. or lower, and the air preheater may adjust the temperature of the air so as to reduce the temperature of the combustion gas flowing from the boiler to higher than 200° C. and 350° C. or lower.

In this manner, the temperature of the combustion gas exhausted from the boiler can be adjusted to 360° C. or higher and 400° C. or lower, and then the combustion gas can be reduced to higher than 200° C. and 350° C. or lower by the air preheater.

In the boiler system of the second aspect of the present invention, the denitrating reagent may be a gas mainly containing at least one of carbon monoxide, hydrogen, and hydrocarbon.

In this manner, a problem that accumulation of ash caused by acid ammonium sulfate increases pressure loss is prevented as compared to a case where ammonia is used as a denitrating reagent. Also, a problem that acid ammonium sulfate produces condensable particulates (for example, particulate matter referred to as PM2.5) is prevented.

The boiler system of the second aspect of the present invention may include a humidification section that humidifies air containing the desulfurizing absorbent supplied by the desulfurizing absorbent supply section and mixes the air in the upstream side of the removal section.

In this manner, a reaction between the sulfur oxide contained in the combustion gas and the desulfurizing absorbent can be promoted to increase desulfurization efficiency.

In the boiler system of the second aspect of the present invention, the temperature of the combustion gas flowing into the removal section may be 210° C. or higher and 270° C. or lower.

In this manner, the combustion gas at the temperature at which denitration efficiency of the removal section is particularly high can be supplied to the removal section, thereby increasing denitration efficiency of the removal section. Also, by setting an upper limit of a service temperature to 270° C., an inexpensive glass fiber woven cloth may be used as a material for a fabric filter used as the removal section.

The boiler system of the first or second aspect of the present invention may include an oxidation treatment section that oxidizes sulfur dioxide contained in the combustion gas exhausted from the boiler and supplied to the air preheater into sulfur trioxide.

In this manner, the sulfur dioxide can be oxidized into the sulfur trioxide and then mixed with the desulfurizing absorbent, thereby reducing an amount of desulfurizing absorbent consumed by desulfurization.

A power plant according to the present invention includes a boiler system described in any of the above.

Advantageous Effects of Invention

The present invention can provide a boiler system capable of removing sulfur oxide and nitrogen oxide in a combustion gas without reducing thermal efficiency of the entire boiler system, and a power plant including the same.

BRIEF DESCRIPTION OF DRAWINGS

FIG. 2 shows comparisons of components contained in various fuels.

FIG. 5 is a system diagram of a boiler system according to a second embodiment of the present invention.

DESCRIPTION OF EMBODIMENT

First Embodiment

With reference to the drawings, a boiler system 100 according to a first embodiment of the present invention will be described.

The boiler system 100 of this embodiment is a coal-fired boiler system that uses, as fuel, pulverized coal obtained by pulverizing coal fuel to desired fineness using a coal pulverizer (not shown). The boiler system 100 is included in a power plant (not shown). The boiler system 100 generates high temperature steam from heat generated by burning pulverized coal, and supplies the steam to a steam turbine (not shown) connected to a generator (not shown). Power of the steam turbine rotated by the steam is transferred to the generator to generate electricity. As such, the boiler system 100 of this embodiment constitutes a part of the power plant (not shown).

Figure 1:
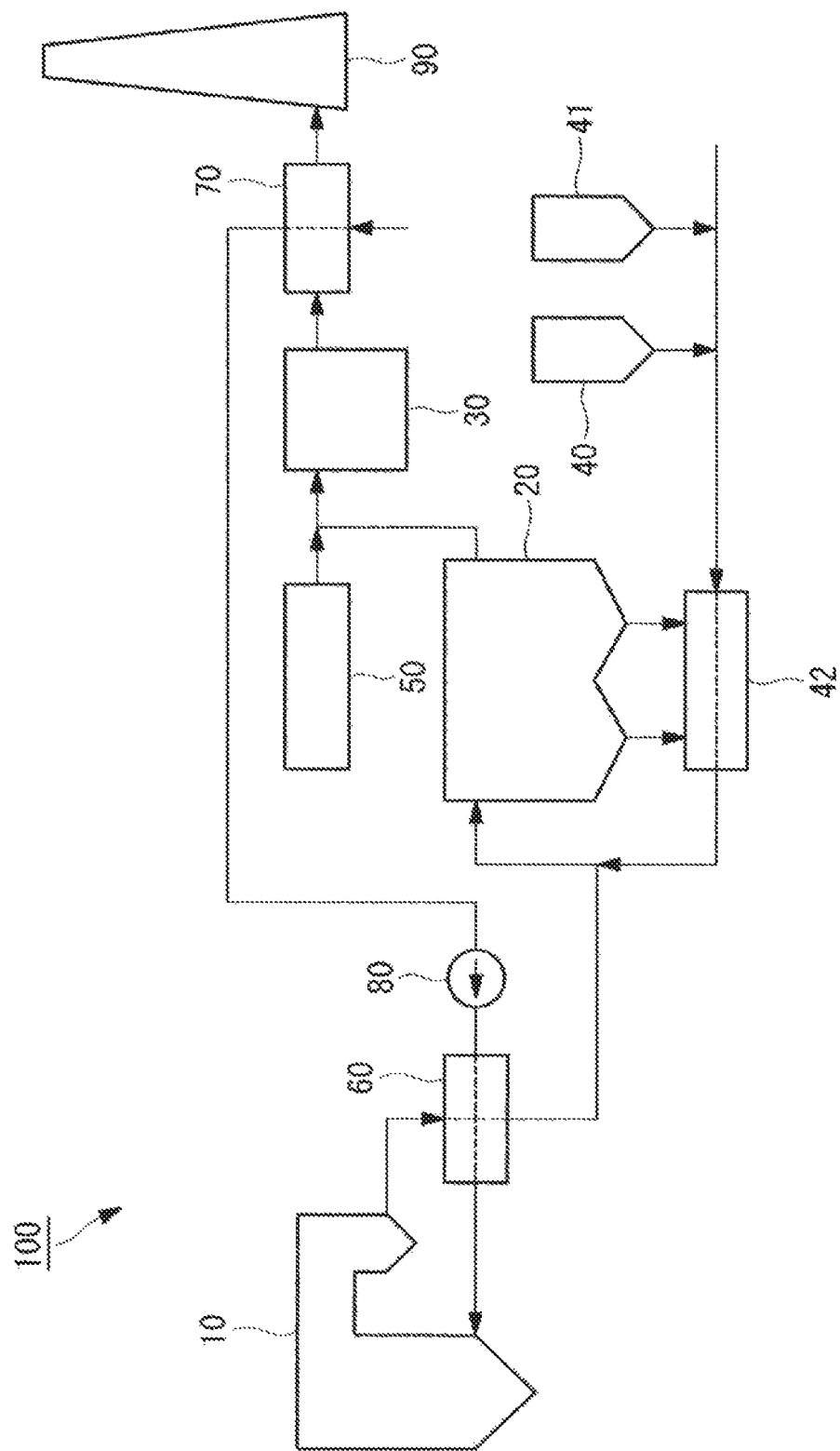
FIG. 1 is a system diagram of a boiler system according to a first embodiment of the present invention.

As shown in FIG. 1, the boiler system 100 of this embodiment includes a boiler 10, a fabric filter 20 (removal section), a denitration section 30, a desulfurizing absorbent supply section 40, an alkali absorbent supply section 41, a humidification mixer 42, a reformer 50, an air preheater 60

(first air preheater), an air preheater 70 (second air preheater), a forced draft fan 80, and a stack 90.

The boiler system 100 of this embodiment includes the fabric filter 20 that removes sulfur oxide on an upstream side of the denitration section 30 in order to prevent a problem caused by sulfur oxide contained in fuel with a high concentration of sulfur content flowing into the denitration section 30.

Also, the fabric filter 20 having a dry desulfurization function is used so that a temperature of a combustion gas flowing into the denitration section 30 on the downstream side of the fabric filter 20 is maintained at around 230° C. at which denitration efficiency is particularly high.

Now, components of the boiler system 100 will be described.

The boiler 10 includes a furnace that burns pulverized coal as fuel (pulverized fuel) supplied together with primary air for conveyance from the coal pulverizer (not shown), and secondary air supplied from the air preheater 60 described later. For example, coals A to D exemplified in FIG. 2 are used as coal as a material for pulverized fuel used in the boiler system 100 of this embodiment.

FIG. 2 shows comparisons of components contained in various fuels. Values in FIG. 2 show weight percent concentrations of the components contained in the fuels. Coals A to E in FIG. 2 are multiple types of coals having different properties. As shown in FIG. 2, among weight percent concentrations of sulfur content contained in the coals A to E, a lower limit value is 0.3% (coal D) and an upper limit value is 0.9% (coal C). Among weight percent concentrations of water content contained in the coals A to E, a lower limit value is 7.5% (coal E) and an upper limit value is 10.3% (coal D).

As such, although the coals as materials for pulverized fuel have different content ratios of components depending on their types, a weight percent concentration of sulfur content is 0.3% or higher and 0.9% or lower, a weight percent concentration of water content is 7.5% or higher and 10.3% or lower. A weight percent concentration of chlorine content contained in the coals is minimal lower (than 0.1%).

The boiler 10 burns pulverized fuel in the furnace to generate a high temperature combustion gas. The high temperature combustion gas is used for heating water and steam passing through an evaporator (not shown) and a superheater (not shown). High temperature and high pressure steam generated by heat exchange with the combustion gas is supplied to the steam turbine (not shown).

A temperature of the combustion gas exhausted outside by the boiler 10 is adjusted to 360° C. or higher and 400° C. or lower. The combustion gas at 360° C. or higher and 400° C. or lower exhausted from the boiler 10 is subjected to heat exchange by the air preheater 60 (first air preheater) and thus adjusted in temperature to 180° C. or higher and 350° C. or lower. The combustion gas at 180° C. or higher and 350° C. or lower is supplied to the fabric filter 20.

The boiler 10 includes an economizer (not shown) and an economizer bypass path (not shown) at a furnace outlet in order to adjust the temperature of the combustion gas exhausted outside. The economizer bypass path is a path through which the combustion gas is exhausted from the furnace outlet without passing through the economizer. Adjusting a flow regulating valve (not shown) provided in the economizer bypass path adjusts a flow rate of the combustion gas passing through the economizer and a flow rate of the combustion gas that does not pass through the economizer. Since heat exchange in the economizer reduces the temperature of the combustion gas, the adjustment with the flow regulating valve adjusts the temperature of the combustion gas exhausted outside. The boiler 10 may previously store, for example, a condition for the temperature of the combustion gas exhausted outside being 360° C. or higher and 400° C. or lower, and control the flow regulating valve under the stored condition.

An amount of heat drawn from the combustion gas flowing from the boiler 10 by the air preheater 60 changes depending on a temperature of air passing through the air preheater 60. A control unit (not shown) that controls the boiler system 100 adjusts the temperature of air blown by the forced draft fan 80 to adjust the amount of heat drawn from the combustion gas by the air preheater 60. Thus, the air preheater 60 adjusts the temperature of the combustion gas so as to reduce the temperature of the combustion gas flowing from the boiler 10 to 180° C. or higher and 350° C. or lower. In order to adjust the temperature of the air blown by the forced draft fan 80, a steam air heater (SAH) may be provided at an air inlet of the air preheater 60.

The temperature of the combustion gas supplied to the fabric filter 20 is adjusted to 180° C. or higher and 350° C. or lower, and more preferably 210° C. or higher and 270° C. or lower. Further preferably, the temperature is about 230° C. The temperature of about 230° C. is preferable because denitration efficiency in the denitration section 30 described later is particularly high at the temperature of the combustion gas of about 230° C.

As such, the boiler 10 and the air preheater 60 adjust the temperature of the combustion gas so that the temperature of the combustion gas supplied to the fabric filter 20 is 180° C. or higher and 350° C. or lower, more preferably 210° C. or higher and 270° C. or lower, and further preferably about 230° C. The temperature of the combustion gas is adjusted in this manner for maintaining denitration efficiency and desulfurization efficiency at respective certain values or higher.

Figure 3:
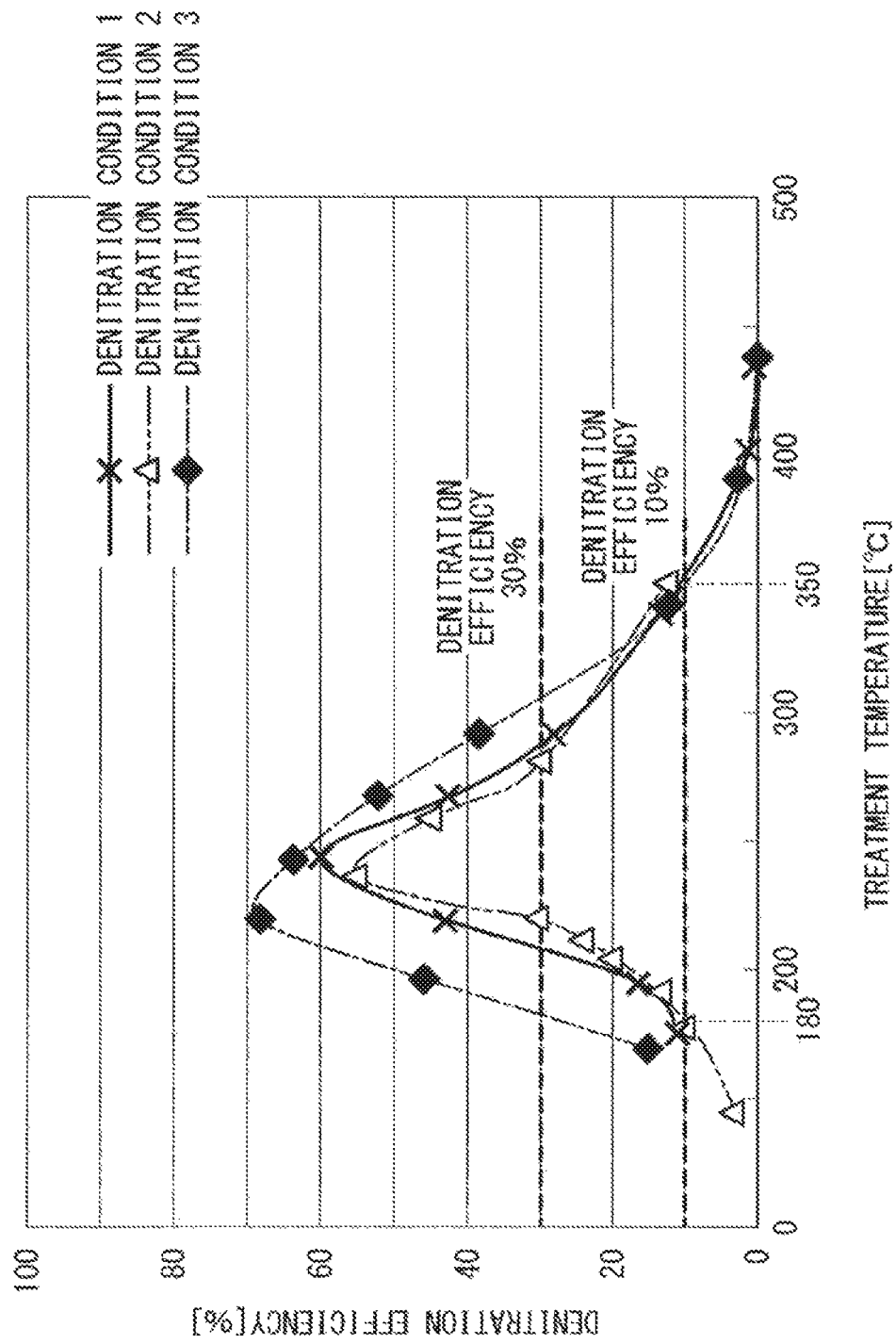
FIG. 3 shows denitration efficiency with respect to a treatment temperature of a combustion gas.
Figure 4:
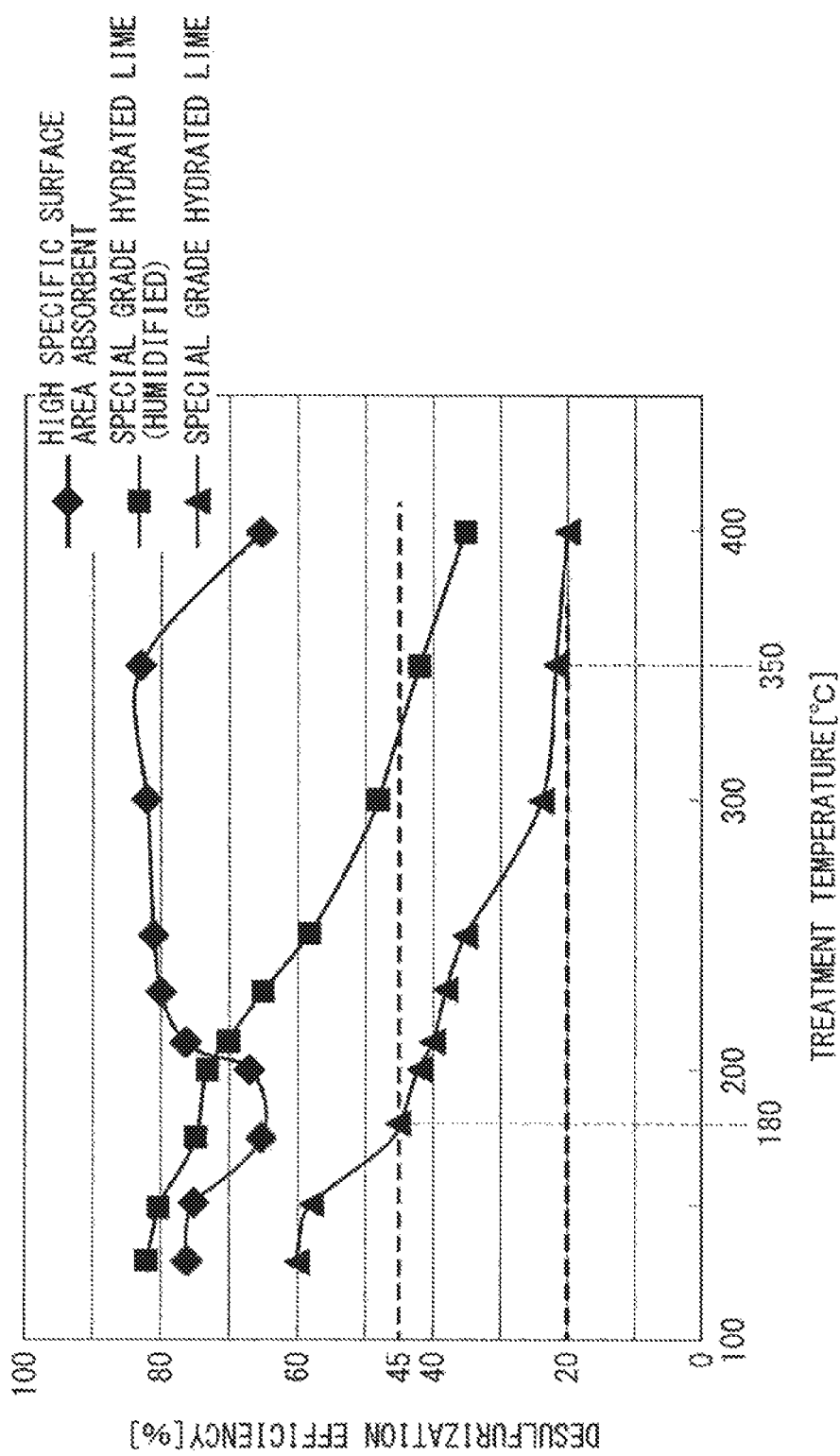
FIG. 4 shows desulfurization efficiency with respect to a treatment temperature of the combustion gas.

The inventors set the range of the temperature of the combustion gas supplied to the fabric filter 20 so that denitration efficiency and desulfurization efficiency are maintained at certain values or higher in view of the drawing showing denitration efficiency with respect to a treatment temperature of the combustion gas (FIG. 3) and the drawing showing desulfurization efficiency with respect to a treatment temperature of the combustion gas (FIG. 4).

FIG. 3 shows denitration efficiency with respect to a treatment temperature of the combustion gas.

FIG. 3 shows denitration efficiency with respect to a treatment temperature (an average temperature of the combustion gas supplied to a catalyst) under a plurality of denitration conditions (denitration conditions 1 to 3) with different combinations between a catalyst and a reagent.

The denitration conditions 1 to 3 in FIG. 3 are as described below. In each denitration condition, an amount of catalyst supported is 100 g per square meter.

<Denitration Condition 1>

Catalyst: catalyst consisting of 1.0 mass percent of iridium (Ir) and 10.0 mass percent of niobium (Nb) supported on silica ($SiO_2$)

Reagent: carbon monoxide (CO) and hydrogen ($H_2$)

<Denitration Condition 2>

Catalyst: catalyst consisting of 1.0 mass percent of platinum (Pt) supported on titanium oxide ($TiO_2$)

Reagent: propylene ($C_3H_6$)

<Denitration Condition 3>

Catalyst: catalyst consisting of 1.0 mass percent of iridium (Ir) supported on silica ($SiO_2$)

Reagent: carbon monoxide (CO) and hydrogen ($H_2$)

As shown in FIG. 3, the denitration efficiency is 10% or higher at the treatment temperature of 180° C. or higher and 350° C. or lower under any of the denitration conditions 1 to 3.

The denitration efficiency is 30% or higher at the treatment temperature of 210° C. or higher and 270° C. or lower under any of the denitration conditions 1 to 3. As such, high denitration efficiency is achieved at the treatment temperature of 210° C. or higher and 270° C. or lower, which is applicable to a system that requires high denitration performance. In particular, highest denitration performance and particularly high denitration efficiency are achieved at the treatment temperature of about 230° C.

As a range of the temperature of the combustion gas supplied to the fabric filter 20 (treatment temperature), for example, a range of higher than 200° C. and 350° C. or lower may be used. As is apparent from FIG. 3, also in this range, the denitration efficiency is 10% or higher under any of the denitration conditions 1 to 3.

The combustion gas exhausted outside by the boiler 10 contains sulfur oxide (SOx) and nitrogen oxide (NOx). Among them, the sulfur oxide containing sulfur dioxide ($SO_2$) and sulfur trioxide ($SO_3$) is removed by desulfurization with the fabric filter 20. The nitrogen oxide containing nitrogen monoxide (NO) and nitrogen dioxide ($NO_2$) is removed by denitration with the denitration section 30.

The fabric filter 20 (desulfurization section) is a device that removes smoke dust (dust) contained in the combustion gas exhausted from the boiler 10 by filtration using a filter (filter cloth). The fabric filter 20 includes a plurality of filtration cylinders to which the filter cloth is attached, and introduces the combustion gas exhausted from the boiler 10 into a dust collection chamber in which the plurality of filtration cylinders are arranged to remove smoke dust (dust). As the filter cloth, for example, a glass fiber woven cloth may be used.

The combustion gas supplied to the fabric filter 20 contains particles derived from sulfur oxide (plaster, calcium sulfite, or the like) absorbed by a desulfurizing absorbent containing hydrated lime (calcium hydroxide) or calcium carbonate described later. The particles derived from sulfur oxide are removed by the fabric filter 20. Thus, the fabric filter 20 functions as a desulfurization section that removes sulfur oxide contained in the combustion gas. The fabric filter 20 removes the particles derived from sulfur oxide using the filter (filter cloth) and is thus a dry desulfurization section.

The combustion gas supplied to the fabric filter 20 contains mercury adsorbed by activated carbon described later. The activated carbon having adsorbed mercury is removed by the fabric filter 20. Thus, the fabric filter 20 also functions as a mercury removal section that removes mercury contained in the combustion gas.

The combustion gas from which smoke dust, particles derived from sulfur oxide, and activated carbon having adsorbed mercury are removed by the fabric filter 20 is supplied to the denitration section 30. As described above, the fabric filter 20 in this embodiment is a dry desulfurization section. Unlike a wet desulfurization section, the fabric filter 20 hardly reduces the temperature of the combustion gas flowing therethrough. Thus, the combustion gas having flowed into the fabric filter 20 at the temperature of 180° C. or higher and 350° C. or lower is supplied to the denitration section 30 while maintaining its temperature.

The smoke dust removed by the fabric filter 20 contains an unreacted desulfurizing absorbent. Then, in order to increase use efficiency of the desulfurizing absorbent, an extraction device (not shown) may be used to extract the unreacted desulfurizing absorbent from the smoke dust. In this case, the desulfurizing absorbent extracted by the extraction device is mixed with the absorbent supplied from the desulfurizing absorbent supply section 40 by the humidification mixer 42.

The desulfurizing absorbent supply section 40 is a device that mixes a powdery absorbent (desulfurizing absorbent) for removing sulfur oxide contained in the combustion gas together with air for conveyance into the combustion gas on the upstream side of the fabric filter 20. As the absorbent, baking soda (bicarbonate of soda), hydrated lime (calcium hydroxide), or calcium carbonate is used. Powdery hydrated lime or calcium carbonate performs a solid-gas reaction with sulfur oxide in the combustion gas to produce mixed particles of plaster, calcium sulfite, or the like. As hydrated lime, for example, special grade hydrated lime defined by JIS R9001:2006 may be used.

The absorbent supplied from the desulfurizing absorbent supply section 40 is humidified by the humidification mixer 42 and then mixed into the combustion gas on the upstream side of the fabric filter 20. The absorbent is humidified by the humidification mixer 42 in order to increase reactivity between sulfur oxide in the combustion gas and the absorbent.

Generally, desulfurization efficiency with an absorbent changes depending on the treatment temperature of the combustion gas, and the desulfurization efficiency tends to be high at around 130° C., and decrease at a temperature higher than 130° C. In the boiler system 100 of this embodiment, the temperature of the combustion gas into which the desulfurizing absorbent is mixed is 180° C. or higher and 350° C. or lower and relatively high. On the other hand, humidifying the desulfurizing absorbent increases the desulfurization efficiency.

Thus, in this embodiment, the humidification mixer 42 humidifies the absorbent to increase reactivity between sulfur oxide in the combustion gas and the absorbent (desulfurization efficiency).

FIG. 4 shows desulfurization efficiency with respect to a treatment temperature.

FIG. 4 shows desulfurization efficiency with respect to a treatment temperature (average temperature of the combustion gas supplied to the desulfurization section) for multiple types of absorbents.

"Special grade hydrated lime" in FIG. 4 refers to special grade hydrated lime defined by JIS R9001:2006, which is not humidified. "Special grade hydrated lime (humidified)" in FIG. 4 refers to special grade hydrated lime defined by JIS R9001:2006, which has been humidified. "High specific surface area absorbent" in FIG. 4 refers to an absorbent having a specific surface area three times or more that of the special grade hydrated lime defined by JIS R9001:2006.

As shown in FIG. 4, in a region with a treatment temperature of 180° C. or higher and 350° C. or lower, the desulfurization efficiency is 20% or higher even when any of the three desulfurizing absorbents is used. Thus, the humidified special grade hydrated lime and the absorbent with a high specific surface area may be applied to a system that requires relatively low desulfurization performance.

Within the range of the treatment temperature of 210° C. or higher and 270° C. or lower, the desulfurization efficiency is 30% or higher even when any of the three desulfurizing absorbents is used. Thus, the humidified special grade hydrated lime and the absorbent with a high specific surface area may be applied to a system that requires relatively high desulfurization performance.

The alkali absorbent supply section 41 is a device that mixes powdery activated carbon for adsorbing mercury contained in the combustion gas together with air for conveyance into the combustion gas on the upstream side of the fabric filter 20. Powdery activated carbon supplied by the alkali absorbent supply section 41 performs a solid-gas reaction with a gas containing mercury contained in the combustion gas, and mercury content is adsorbed by the activated carbon. The activated carbon having adsorbed the mercury content is removed from the combustion gas by the filter cloth of the fabric filter 20 described above.

The reformer 50 (denitrating reagent supply section) is a device that mixes a reagent for removing nitrogen oxide contained in the combustion gas into the combustion gas on the upstream side of the denitration section 30. As the reagent, a gas mainly containing carbon monoxide (CO) and hydrogen ($H_2$) is used. Ammonia ($NH_3$) is not used as the reagent in order to prevent a problem caused by sulfur oxide that cannot be completely removed by the fabric filter 20 and ammonia reacting to generate acid ammonium sulfate (($NH_4$)$HSO_4$).

The reformer 50 reforms a liquefied natural gas (LNG) mainly containing methane ($CH_4$) and water ($H_2O$) to generate a gas mainly containing carbon monoxide (CO) and hydrogen ($H_2$). The reformer 50 mixes carbon dioxide ($CO_2$) as appropriate in order to adjust a ratio between carbon content and hydrogen content in the generated gas.

The denitration section 30 is a device that removes nitrogen oxide contained in the combustion gas from which sulfur oxide is removed by the fabric filter 20. The denitration section 30 supports a catalyst (for example, iridium) for causing a reaction between nitrogen oxide contained in the combustion gas and carbon monoxide as a reagent. The denitration section 30 also supports a catalyst (for example, platinum, palladium, or iridium) for causing a reaction between nitrogen oxide contained in the combustion gas and hydrogen as a reagent.

In the above, the denitration section 30 relies on a Hydro Carbon-Selective Catalytic Reduction (HC-SCR) reaction using carbon monoxide and hydrogen generated by the reformer 50 as reagents, and using platinum, palladium, and iridium as catalysts, but a modification as described below may be adopted.

A denitration section 30 of the modification relies on a urea SCR reaction using ammonia ($NH_3$) as a reagent.

A denitration catalyst used in the urea SCR reaction is a structure consisting of active metal such as vanadium (V), tungsten (W), or molybdenum (Mo) supported in a carrier (base) mainly made of titanium oxide.

In the case of the modification in which the denitration section 30 relies on the urea SCR reaction, the reformer 50 is replaced by an ammonia spray device that sprays ammonia on the upstream side of the denitration section 30 to mix the ammonia with the combustion gas.

In the case of the modification in which the denitration section 30 relies on the urea SCR reaction, using activated carbon as a denitration catalyst rather than the denitration catalyst described above reduces catalyst performance of the activated carbon with time, which requires equipment for recovering catalyst performance. Thus, in the denitration section 30 of the modification, a denitration catalyst is desirably used other than a denitration catalyst that requires recovery of catalyst performance during an operation period assumed as a life of the denitration section 30 such as activated carbon.

Nitrogen oxide contained in the combustion gas having flowed into the denitration section 30 reacts with the reagent by the action of the catalyst, and is thus removed from the combustion gas. In the boiler system 100 of this embodiment, the temperature of the combustion gas exhausted from the fabric filter 20 is 180° C. or higher and 350° C. or lower and relatively high.

The denitration efficiency in the denitration section 30 is relatively high in a region with a temperature of the combustion gas of 180° C. or higher and 350° C. or lower. The denitration efficiency is particularly high at 210° C. or higher and 270° C. or lower, and particularly high at about 230° C. As described above, the combustion gas at a relatively high temperature of 180° C. or higher and 350° C. or lower flows into the denitration section 30 without being heated by a heating device on the upstream side of the denitration section 30. Nitrogen oxide in the combustion gas at 180° C. or higher and 350° C. or lower is denitrated with high denitration efficiency by the denitration section 30.

As such, in the boiler system 100 of this embodiment, the combustion gas from which sulfur oxide is removed by the fabric filter 20 flows into the denitration section 30 while maintaining its temperature without being heated by a heating device or the like on the upstream side of the denitration section 30. The combustion gas flows out of the fabric filter 20 for dry desulfurization with little reduction in temperature from an inflow temperature, and flows into the denitration section 30 while maintaining its temperature, and thus the heating device is not provided on the upstream side of the denitration section 30 to reduce thermal efficiency of the entire boiler system 100.

The air preheater 60 (first air preheater) is a device that exchanges heat between the combustion gas exhausted from the boiler 10 and air. Air blown by the forced draft fan 80 is supplied to the air preheater 60, and the air preheater 60 exchanges heat between the supplied air and the combustion gas, and supplies the heated air to the boiler 10 as secondary air. The combustion gas at 380° C. or higher and 400° C. or lower exhausted from the boiler 10 is adjusted so that the temperature is reduced to 180° C. or higher and 350° C. or lower by the heat exchange in the air preheater 60.

The air preheater 70 (second air preheater) is a device that exchanges heat between the combustion gas from which nitrogen oxide (NOx) is removed by the denitration section 30 and air (outside air). The air preheater 70 exchanges heat between air and the combustion gas, and supplies the heated air to the air preheater 60. The combustion gas at 180° C. or higher and 350° C. or lower exhausted from the denitration section 30 is adjusted so that the temperature thereof is about 90° C. by the heat exchange in the air preheater 70.

The combustion gas having passed through the air preheater 70 and reached about 90° C. is exhausted from the stack 90 out of the boiler system 100.

In the descriptions above, the boiler system 100 of this embodiment is the coal-fired boiler system, but a different aspect may be adopted. For example, the boiler system 100 may be a heavy oil-fired boiler system that uses heavy oil as fuel. As shown in FIG. 2 as an example, in the heavy oil, a weight percent concentration of sulfur content is 4.5% or higher and 7.6% or lower, a weight percent concentration of chlorine content is minimal (lower than 0.1%), and a weight percent concentration of water content is minimal (lower than 7.5%).

The boiler system 100 may be a biomass-only combustion boiler system or a biomass-mixed combustion boiler system that uses biomass as fuel. As shown in FIG. 2 as an example, in biomass, a weight percent concentration of sulfur content is 0.1%, a weight percent concentration of chlorine content is minimal (lower than 0.1%), and a weight percent concentration of water content is minimal (lower than 7.5%).

As such, the boiler system 100 of this embodiment may use coal, heavy oil, or biomass as fuel. When any of these is used as fuel, the fuel contains sulfur content at a weight percent concentration of 0.3% or higher and 7.6% or lower, chlorine content at a weight percent concentration of lower than 0.1%, and water content at a weight percent concentration of 10.3% or lower.

As the fuel (coal, heavy oil, biomass) used by the boiler system 100 of this embodiment, other fuel presenting a property different from that of the example in FIG. 2 may be used. In this case, the fuel contains sulfur content at a weight percent concentration of 0.3% or higher and lower than 8.0%, chlorine content at a weight percent concentration of lower than 0.1%, and water content at a weight percent concentration of 20.0% or lower.

As shown in FIG. 2, as compared to coal, heavy oil, or biomass used as fuel by the boiler system 100 of this embodiment, municipal solid waste in a comparative example contains sulfur content at a low weight percent concentration of 0.0% or higher and 0.2% or lower, and chlorine content at a high weight percent concentration of 0.1% or higher and 0.2% or lower. The municipal solid waste in the comparative example contains water content at a weight percent concentration of 43.0% or higher and 58.0% or lower, which is much higher than the weight percent concentration of the water content contained in the fuel for the boiler system 100 of this embodiment.

In a waste incinerator that burns municipal solid waste, since the municipal solid waste contains high chlorine content, incomplete combustion of combustible materials containing chlorine content generates dioxin. A combustion gas at a high temperature (for example, 800° C. or higher) exhausted from the waste incinerator needs to be rapidly cooled to a low temperature (for example, 180° C. or lower) in order to prevent dioxin resynthesis.

Also in the waste incinerator, in order for the denitration section to denitrate nitrogen oxide contained in the combustion gas rapidly cooled to the low temperature with desired denitration efficiency, the combustion gas needs to be reheated on the upstream side of the denitration section. Thus, cooling for preventing generation of dioxin and reheating for increasing denitration efficiency reduces thermal efficiency of the entire waste incinerator.

As such, the property of municipal solid waste is significantly different from the property of the fuel (coal, heavy oil, biomass) used by the boiler system 100. The boiler system 100 of this embodiment does not include means for cooling and reheating the combustion gas in order to increase thermal efficiency. Thus, municipal solid waste cannot be used as the fuel used by the boiler system 100 of this embodiment.

Operations and effects of the boiler system 100 of this embodiment described above will be described below.

According to the boiler system 100 of this embodiment, the fabric filter 20 that performs dry desulfurization on the upstream side of the denitration section 30 removes sulfur oxide from the combustion gas exhausted from the boiler 10 that burns fuel containing sulfur content at a high weight percent concentration of 0.3% or higher and 8.0% or lower. This reduces an amount of sulfur oxide contained in the combustion gas flowing into the denitration section 30 arranged on the downstream side of the fabric filter 20.

The fabric filter 20 has a dry desulfurization function, and thus causes little reduction in temperature of the combustion gas as compared to a wet one, and the temperature of the combustion gas is maintained at 180° C. or higher and 350° C. or lower between before and after passage through the fabric filter 20. Thus, there is no need to provide a heating device for heating the combustion gas to a temperature at which a denitration reaction is obtained on the upstream side of the denitration section 30. Thus, the denitration section 30 can remove nitrogen oxide without reducing thermal efficiency of the entire boiler system.

Also according to the boiler system 100 of this embodiment, the temperature of the combustion gas flowing into the fabric filter 20 that removes sulfur oxide and the denitration section 30 that removes nitrogen oxide is maintained at 180° C. or higher and 350° C. or lower. Maintaining the temperature of the combustion gas within such a range allows desulfurization efficiency and denitration efficiency to be maintained at respective certain values or higher.

The temperature of the combustion gas flowing into the fabric filter 20 is preferably 210° C. or higher and 270° C. or lower in order to maintain high denitration efficiency in the denitration section 30 arranged on the downstream side of the fabric filter 20.

As such, according to this embodiment, the boiler system 100 can be provided capable of preventing a problem caused by passage of the combustion gas containing sulfur oxide, and removing sulfur oxide and nitrogen oxide in the combustion gas without reducing thermal efficiency of the entire boiler system.

In the boiler system 100 of this embodiment, a denitrating reagent is a reformed LNG mainly containing carbon monoxide (CO) and hydrogen ($H_2$). Alternatively, the reagent is unburned hydrocarbon.

In this manner, a problem that accumulation of acid ammonium sulfate or the like increases pressure loss is prevented as compared to a case where ammonia is used as a denitrating reagent. Also, a problem that acid ammonium sulfate produces condensable particulates (for example, particulate matter referred to as PM2.5) is prevented.

The boiler system 100 of this embodiment includes the humidification mixer 42 (humidification section) that humidifies air containing a desulfurizing absorbent supplied by the desulfurizing absorbent supply section and supplies the air to the upstream side of the fabric filter 20.

In this manner, a reaction between sulfur oxide contained in the combustion gas and the desulfurizing absorbent can be promoted to increase desulfurization efficiency.

Second Embodiment

Next, with reference to the drawings, a boiler system 200 according to a second embodiment of the present invention will be described.

The second embodiment is a modification of the first embodiment, and is the same as the first embodiment except as particularly described below, and thus descriptions will be omitted.

In the boiler system 100 of the first embodiment, the fabric filter 20 removes sulfur oxide contained in the combustion gas, and the denitration section 30 removes nitrogen oxide contained in the combustion gas. In this embodiment, a fabric filter 20' supports a denitrating catalyst and thus removes both sulfur oxide and nitrogen oxide.

As shown in FIG. 5, the boiler system 200 of this embodiment does not include the denitration section 30 included in the boiler system 100 of the first embodiment. In the boiler system 200 of this embodiment, a reformer 50 mixes a gas mainly containing carbon monoxide (CO) and hydrogen ($H_2$) as reagents into the combustion gas on an upstream side of the fabric filter 20.

The fabric filter 20' in this embodiment supports a catalyst (for example, iridium) for causing a reaction between nitrogen oxide contained in the combustion gas and carbon monoxide as a reagent. The fabric filter 20' also supports a catalyst (for example, platinum, palladium, or iridium) for causing a reaction between nitrogen oxide contained in the combustion gas and hydrogen as a reagent.

The nitrogen oxide contained in the combustion gas having flowed into the fabric filter 20' reacts with the reagent by the action of the catalyst supported by the fabric filter 20' and is thus removed from the combustion gas. In the boiler system 200 of this embodiment, a temperature of the combustion gas exhausted from the fabric filter 20' is 210° C. or higher and 350° C. or lower and relatively high.

Denitration efficiency in the fabric filter 20' is relatively high in a region with a temperature of the combustion gas of 180° C. or higher and 350° C. or lower. The denitration efficiency is particularly high at 210° C. or higher and 270° C. or lower, and particularly high at about 230° C. Nitrogen oxide in the combustion gas at 180° C. or higher and 350° C. or lower is denitrated with high denitration efficiency by the fabric filter 20'.

As a range of the temperature of the combustion gas supplied to the fabric filter 20' (treatment temperature), for example, a range of higher than 200° C. and 350° C. or lower may be used. As is apparent from FIG. 3, also in this range, the denitration efficiency is 10% or higher under any of denitration conditions 1 to 3.

The fabric filter 20' has a dry desulfurization function, and thus causes little reduction in temperature of the combustion gas as compared to a wet one. The removal section removes sulfur oxide and nitrogen oxide, and thus the temperature of the combustion gas is maintained at 180° C. or higher and 350° C. or lower. Thus, there is no need to provide a heating device for heating the combustion gas to a temperature at which a denitration reaction is obtained. Thus, the fabric filter 20' can remove nitrogen oxide without reducing thermal efficiency.

In the boiler system 200 of this embodiment, the fabric filter 20' has both a desulfurization function of removing sulfur oxide and a denitration function of removing nitrogen oxide. This can reduce a size of equipment as compared to a case where a desulfurization section having a desulfurization function and a denitration section having a denitration function are separately provided.

The boiler system 200 of this embodiment uses a gas mainly containing carbon monoxide (CO) and hydrogen ($H_2$) as reagents mixed into the combustion gas on the upstream side of the fabric filter 20'. Carbon monoxide (CO) and hydrogen ($H_2$) hardly adsorb smoke dust (dust) removed by the fabric filter 20'. This can prevent a problem that an unreacted reagent adsorbs smoke dust and is wasted like ammonia. Also, a problem that acid ammonium sulfate generated by using ammonia as a reagent produces condensable particulates (for example, particulate matter referred to as PM2.5) is prevented.

In this manner, the boiler system 200 of this embodiment is capable of preventing a problem caused by passage of the combustion gas containing sulfur oxide, and removing sulfur oxide and nitrogen oxide in the combustion gas without reducing thermal efficiency.

Third Embodiment

Next, a boiler system according to a third embodiment of the present invention will be described.

The third embodiment is a modification of the first or second embodiment, and is the same as the embodiments except as particularly described below, and thus descriptions will be omitted.

The boiler system of this embodiment is such that an oxidation treatment section (not shown) is added to the boiler system 100 of the first embodiment or the boiler system 200 of the second embodiment.

The oxidation treatment section is provided in a flow path of a combustion gas between a boiler 10 and an air preheater 60.

The oxidation treatment section is a device for oxidizing sulfur dioxide ($SO_2$) as sulfur oxide contained in the combustion gas exhausted from the boiler 10 into sulfur trioxide ($SO_3$). The oxidation treatment section uses vanadium pentoxide ($V_2O_5$) as a catalyst, and causes a reaction between oxygen in air and sulfur dioxide to generate sulfur trioxide.

As compared to sulfur dioxide, sulfur trioxide easily reacts with hydrated lime (calcium hydroxide) or calcium carbonate as an absorbent supplied by a desulfurizing absorbent supply section 40.

Thus, in this embodiment, the oxidation treatment section is provided on an upstream side of a position to which the absorbent is supplied by the desulfurizing absorbent supply section 40 in order to increase desulfurization efficiency of the combustion gas.

As such, the boiler system of this embodiment includes the oxidation treatment section that oxidizes sulfur dioxide contained in the combustion gas exhausted from the boiler 10 and supplied to the air preheater 60 into sulfur trioxide.

In this manner, sulfur dioxide can be oxidized into sulfur trioxide and then mixed with a desulfurizing absorbent, thereby reducing an amount of the desulfurizing absorbent consumed by desulfurization.

Other Embodiment

In this embodiment, the humidification mixer 42 humidifies the absorbent in order to increase desulfurization efficiency of the combustion gas at relatively high temperature of 180° C. or higher and 350° C. or lower, but a different aspect may be adopted.

For example, an absorbent having a large specific surface area (surface area per unit mass) may be used without using the humidification mixer 42. This is because a larger specific surface area increases reactivity of the absorbent (desulfurization efficiency). For example, an absorbent having a specific surface area twice or more that of special grade hydrated lime defined by JIS R9001:2006 is desirably used. An absorbent having a specific surface area three times or more that of special grade hydrated lime is more desirably used.

Also, for example, in addition to the humidification mixer 42 humidifying an absorbent, an absorbent having a large specific surface area may be used.

In this embodiment, carbon dioxide ($CO_2$) recovered by a carbon dioxide recovery device (not shown) may be supplied to the reformer 50. The carbon dioxide recovery device is a device that absorbs carbon dioxide contained in the combustion gas exhausted by the boiler system 100, 200 with an absorbing liquid, and then separates the absorbed carbon dioxide. In this manner, carbon dioxide can be supplied to the reformer 50 without using a separate supply source of carbon dioxide.

In this embodiment, for example, a glass fiber woven cloth is used as a filter for the fabric filter 20, 20', but a different aspect may be adopted. For example, a heat-resistant ceramic filter may be used as the filter.

REFERENCE SIGNS LIST 10 boiler
20, 20' fabric filter (removal section)
30 denitration section
40 desulfurizing absorbent supply section
41 alkali absorbent supply section
42 humidification mixer (humidification section)
50 reformer (denitrating reagent supply section)
60 air preheater (first air preheater)
70 air preheater (second air preheater)
80 forced draft fan
90 stack
100, 200 boiler system

The invention claimed is:

1. A boiler system comprising:
a boiler that burns fuel containing sulfur content at a weight percent concentration of lower than 8.0%, chlorine content at a weight percent concentration of lower than 0.1%, and water content at a weight percent concentration of lower than 20.0% to generate a combustion gas;
a removal section that is arranged on a downstream side of the boiler and that removes sulfur oxide contained in the combustion gas and removes smoke dust contained in the combustion gas;
a denitration section that is arranged on a downstream side of the removal section and that removes nitrogen oxide contained in the combustion gas from which the sulfur oxide has been removed by the removal section;
a desulfurizing absorbent supply section that mixes a desulfurizing absorbent for removing sulfur oxide contained in the combustion gas into the combustion gas on an upstream side of the removal section; and
a denitrating reagent supply section that mixes a denitrating reagent for removing nitrogen oxide contained in the combustion gas into the combustion gas on an upstream side of the denitration section,
wherein the removal section performs dry desulfurization, and a temperature of the combustion gas flowing into the removal section is higher than 200° C. and 350° C. or lower, and
the combustion gas from which the sulfur oxide has been removed by the removal section flows into the denitration section without being heated on the upstream side of the denitration section.

2. The boiler system according to claim 1, further comprising an air preheater that is arranged between the boiler and the removal section and that exchanges heat between the combustion gas exhausted from the boiler and air, supplies the heated air to the boiler as secondary air, and supplies the combustion gas having been reduced in temperature by heat exchange with the air to the removal section.

3. The boiler system according to claim 2, wherein the boiler adjusts the temperature of the combustion gas so that the temperature of the combustion gas exhausted outside is 360° C. or higher and 400° C. or lower, and
the air preheater adjusts the temperature of the air so as to reduce the temperature of the combustion gas flowing from the boiler to higher than 200° C. and 350° C. or lower.

4. The boiler system according claim 1, wherein the denitrating reagent is a gas mainly containing at least one of carbon monoxide, hydrogen, and hydrocarbon.

5. The boiler system according to claim 1, further comprising a humidification section that humidifies air containing the desulfurizing absorbent supplied by the desulfurizing absorbent supply section and supplies the air to the upstream side of the removal section.

6. The boiler system according to claim 1, wherein the temperature of the combustion gas flowing into the removal section is 210° C. or higher and 270° C. or lower.

7. A boiler system comprising:
a boiler that burns fuel containing at least sulfur content, chlorine content, and water content, a weight percent concentration of the sulfur content being lower than 8.0%, a weight percent concentration of the chlorine content being lower than 0.1%, and a weight percent concentration of the water content being lower than 20.0%, to generate a combustion gas;
a removal section that is arranged on a downstream side of the boiler and that removes sulfur oxide and nitrogen oxide contained in the combustion gas;
a desulfurizing absorbent supply section that mixes a desulfurizing absorbent for removing sulfur oxide contained in the combustion gas into the combustion gas on an upstream side of the removal section; and
a denitrating reagent supply section that mixes a denitrating reagent for removing nitrogen oxide contained in the combustion gas into the combustion gas on the upstream side of the removal section,
wherein the removal section has a dry desulfurization function, and a temperature of the combustion gas flowing into the removal section is higher than 200° C. and 350° C. or lower.

8. The boiler system according to claim 7, further comprising an air preheater that is arranged between the boiler and the removal section and that exchanges heat between the combustion gas exhausted from the boiler and air, supplies the heated air to the boiler as secondary air, and supplies the combustion gas having been reduced in temperature by heat exchange with the air to the removal section.

9. The boiler system according to claim 8, wherein the boiler adjusts the temperature of the combustion gas so that the temperature of the combustion gas exhausted outside is 360° C. or higher and 400° C. or lower, and
the air preheater adjusts the temperature of the air so as to reduce the temperature of the combustion gas flowing from the boiler to higher than 200° C. and 350° C. or lower.

10. The boiler system according to claim 7, wherein the denitrating reagent is a gas mainly containing at least one of carbon monoxide, hydrogen, and hydrocarbon.

11. The boiler system according to claim 7, further comprising a humidification section that humidifies air containing the desulfurizing absorbent supplied by the desulfurizing absorbent supply section and mixes the air in the upstream side of the removal section.

12. The boiler system according to claim 7, wherein the temperature of the combustion gas flowing into the removal section is 210° C. or higher and 270° C. or lower.

13. The boiler system according to claim 2, further comprising an oxidation treatment section that oxidizes sulfur dioxide contained in the combustion gas exhausted from the boiler and supplied to the air preheater into sulfur trioxide.

14. A power plant comprising:
a boiler system according to claim 1;
a steam turbine driven by steam generated by the boiler system; and a generator that uses power of the steam turbine to generate electricity.

15. The boiler system according to claim 8, further comprising an oxidation treatment section that oxidizes sulfur dioxide contained in the combustion gas exhausted from the boiler and supplied to the air preheater into sulfur trioxide.

16. An operation method for operating a boiler system including a boiler that burns fuel containing sulfur content at a weight percent concentration of lower than 8.0%, chlorine content at a weight percent concentration of lower than 0.1%, and water content at a weight percent concentration of lower than 20.0% to generate a combustion gas, the method comprising:
   a desulfurizing absorbent supply step that mixes a desulfurizing absorbent for removing sulfur oxide contained in the combustion gas into the combustion gas;
   a removal step that removes the sulfur oxide contained in the combustion gas and removes smoke dust contained in the combustion gas by using a removal section that removes the sulfur oxide contained in the combustion gas and removes the smoke dust contained in the combustion gas;
   a denitrating reagent supply step that mixes a denitrating reagent for removing nitrogen oxide contained in the combustion gas into the combustion gas; and
   a denitration step that removes the nitrogen oxide contained in the combustion gas from which the sulfur oxide has been removed by the removal step,
   wherein the removal step performs dry desulfurization, and a temperature of the combustion gas in the removal step is higher than 200° C. and 350° C. or lower, and
   the combustion gas from which the sulfur oxide has been removed by the removal step flows into the denitration step without being heated.

17. An operation method for operating a boiler system including a boiler that burns fuel containing at least sulfur content, chlorine content, and water content, a weight percent concentration of the sulfur content being lower than 8.0%, a weight percent concentration of the chlorine content being lower than 0.1%, and a weight percent concentration of the water content being lower than 20.0%, to generate a combustion gas, the method comprising:
   a desulfurizing absorbent supply step that mixes a desulfurizing absorbent for removing sulfur oxide contained in the combustion gas into the combustion gas;
   a denitrating reagent supply step that mixes a denitrating reagent for removing nitrogen oxide contained in the combustion gas into the combustion gas; and
   a removal step that removes the sulfur oxide and the nitrogen oxide contained in the combustion gas by using a removal section that removes the sulfur oxide and the nitrogen oxide contained in the combustion gas,
   wherein the removal step performs a dry desulfurization, and a temperature of the combustion gas in the removal step is higher than 200° C. and 350° C. or lower.

* * * * *